(12) United States Patent
Vita et al.

(10) Patent No.: US 9,215,104 B1
(45) Date of Patent: Dec. 15, 2015

(54) FLOATING TAPS FOR DECISION FEEDBACK EQUALIZER

(71) Applicant: INTEL CORPORATION, Santa Clara, CA (US)

(72) Inventors: Michael De Vita, Santa Clara, CA (US); Shenggao Li, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/498,025

(22) Filed: Sep. 26, 2014

(51) Int. Cl.
*H03H 7/40* (2006.01)
*H04L 25/03* (2006.01)

(52) U.S. Cl.
CPC ................................ *H04L 25/03025* (2013.01)

(58) Field of Classification Search
CPC .................. H04L 25/0307; H04L 2025/0349; H04L 202/03019; H04L 2025/038755
USPC .................. 375/233, 238; 327/153, 144, 261
See application file for complete search history.

(56) References Cited

U.S. PATENT DOCUMENTS

| | | | |
|---|---|---|---|
| 2005/0135470 A1* | 6/2005 | Momtaz | 375/233 |
| 2009/0307518 A1* | 12/2009 | Hsieh | 713/501 |
| 2011/0309865 A1* | 12/2011 | Cordos | 327/153 |
| 2013/0228672 A1* | 9/2013 | Jung et al. | 250/208.1 |

OTHER PUBLICATIONS

Ricky Yuen, "A 6Gbps Transmitter with ISI and Reflection Cancellation," Master of Applied Science, 2005, Graduate Department of Electrical and Computer Engineering University of Toronto.

\* cited by examiner

*Primary Examiner* — Khai Tran
(74) *Attorney, Agent, or Firm* — Schwabe, Williamson & Wyatt, P.C.

(57) ABSTRACT

Described are apparatuses and methods for generating floating taps for decision feedback equalizers. An apparatus may include a first delay cell including a first group of binary weighted sets of flip-flops to output a first signal, and a second delay cell including a second group of binary weighted sets of flip-flops to output a second signal. The apparatus may further include a multiplexer coupled to the first delay cell and the second delay cell to output a tap signal based on the first signal and the second signal. Other embodiments may be described and/or claimed.

20 Claims, 8 Drawing Sheets

FLOATING TAPS FOR DECISION FEEDBACK EQUALIZER

TECHNICAL FIELD

This disclosure relates generally to electronic circuits. More particularly but not exclusively, the present disclosure relates to apparatuses and methods for generating floating taps for decision feedback equalizers.

BACKGROUND

Decision feedback equalizers (DFEs) may be used to remove interference on received signals, e.g., due to the channel's impulse response. The traditional DFE may remove interference directly after the initial pulse. However, in certain channels there can be more interference, or reflections, farther away that are caused by discontinuities in the channel. These reflections may occur at various locations depending on the channel or board used.

The background description provided herein is for generally presenting the context of the disclosure. Unless otherwise indicated herein, the materials described in this section are not prior art to the claims in this application and are not admitted to be prior art or suggestions of the prior art, by inclusion in this section.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

The embodiments described herein include apparatuses and methods generating floating taps for decision feedback equalizers (DFEs). In one embodiment, an apparatus may include a first delay cell including a first group of binary weighted sets of flip-flops to output a first signal, and a second delay cell including a second group of binary weighted sets of flip-flops to output a second signal. The apparatus may further include a multiplexer coupled to the first delay cell and the second delay cell to output a tap signal based on the first signal and the second signal. These embodiments will be described in more detail below. Other technical effects will also be evident from the descriptions to follow.

In the following description, numerous details are discussed to provide a more thorough explanation of embodiments of the present disclosure. However, it will be apparent to one skilled in the art that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal, or data/clock signal. The meaning of "a," "an," and "the" include plural references. The meaning of "in" includes "in" and "on."

The terms "substantially," "close," "approximately," "near," and "about" generally refer to being within +/−20% of a get value. The term "scaling" generally refers to converting a design (schematic and layout) from one process technology to another process technology. The term "scaling" generally also refers to downsizing layout and devices within the same technology node. The term "scaling" may also refer to adjusting (e.g., slowing down) a signal frequency relative to another parameter, for example, power supply level.

Unless otherwise specified, the use of the ordinal adjectives "first," "second," "third," etc., to describe a common object merely indicate that different instances of like objects are being referred to, and are not intended to imply that the objects so described must be in a given sequence, either temporally, spatially, in ranking, or in any other manner.

Figure 1:
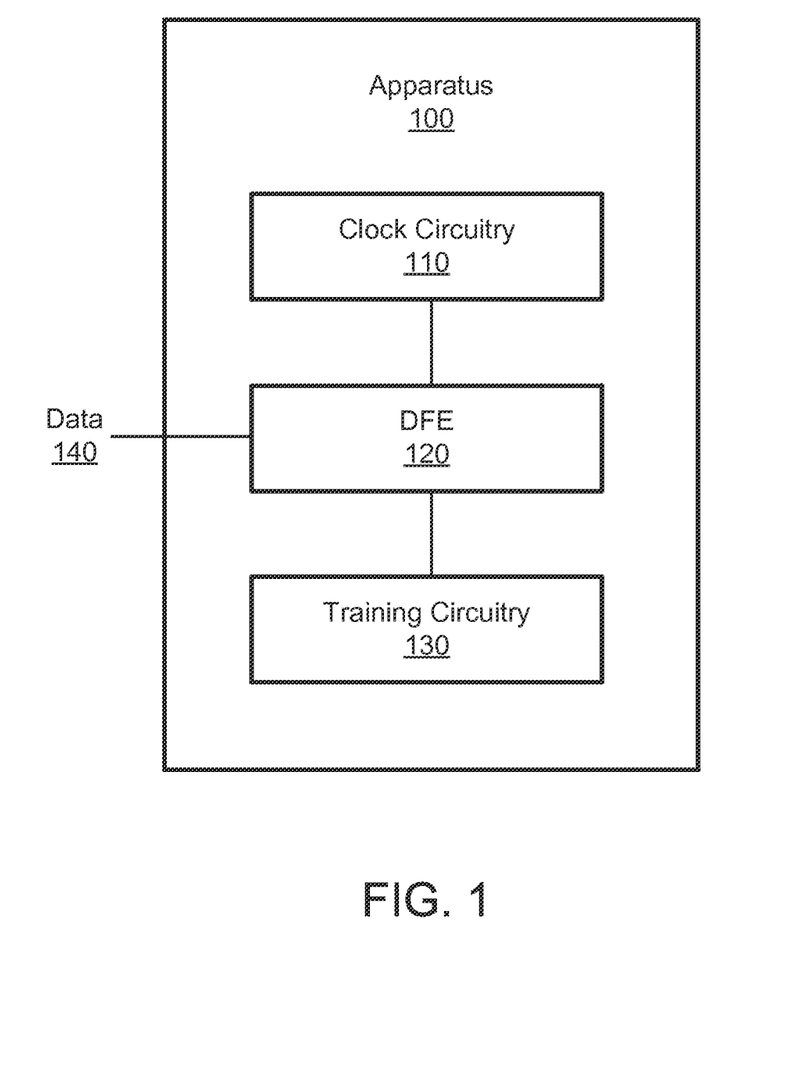
FIG. 1 is a block diagram that illustrates an example apparatus for generating floating taps for decision feedback equalizers, incorporating aspects of the present disclosure, in accordance with various embodiments.

FIG. 1 is a block diagram that illustrates an example apparatus for generating floating taps fir decision feedback equalizers. In various embodiments, apparatus 100 may include DFE 120 coupled with clock circuitry 110 and training circuitry 130. In various embodiments, DFE 120 may be used to remove interference on received data 140. The received data 140 may be encoded iii a signal received on a channel.

In various embodiments, the signal received on the channel may suffer from interference. As an example, inter-symbol interference (ISI) may occur when a transmitted pulse broadens over more than one unit internal (UI). The UI is the minimum time interval between condition changes of a data transmission signal, also known as the pulse time or symbol duration time. One UI may or may not correspond to one cycle of an associated clock signal. As an example, in half-rate architecture, one clock cycle can be two UIs.

With interference, signal may be significantly degraded, e.g., even over a short distance of transmission within a circuit board. The amount of ISI that a DFE may correct is related to the number of taps that the DFE has. As an example, ISI may be characterized by the channel's impulse response, which usually starts as an initial pulse (also known as the cursor), followed by several smaller pulses. The number of pulses after the cursor and their respective severity may dependent on the channel. Thus, a DFE with a large number of taps may be used to reduce ISI in various channels. However, such a DFE may consume a lot of power and space.

In various embodiments, DFE 120 may generate floating taps to equalize the channel and reduce ISI in a wide range of symbols. The floating taps may correspond to respective delayed versions of the received signal, and may be used to remove reflections. DFE 120 may move taps around (e.g., as floating taps) depending on the channel (e.g., one channel might have a reflection 5 UI later while another might be 10 UI later). The tap positions in DEE 120 may be controlled by training circuitry 130, e.g., using respective binary numbers. The locations of reflections may vary among different channels or in a same channel (e.g., based on temperature variations). In various embodiments, training circuitry 130 may enable DFE 120 to find a suitable floating tap position based on where reflections occur. Subsequently, DFE 120 may adjust the magnitudes and polarities of the tap weights (e.g., the amount of voltage/current used to remove the ISI) to match the channel characteristics, either manually or automatically based on a suitable adaptive algorithm. Then, the selected tap with its associated tap weight may be used to remove interference in the data signal.

In some embodiments, DFE 120 may be used to cancel interference without amplifying noise or crosstalk as a non-linear equalizer. Thus, apparatus 100 may add equalization functions to input/output (I/O) circuitry even with significant channel losses, e.g., greater than 20 dB.

In various embodiments, clock circuitry 110 array generate a clock to be a half-rate of a data rate of the data 140, and facilitate DFE 120 to operate in a half-rate architecture. As an example, if data 140 is received by apparatus 100 is a 10 Gbps signal, then clock circuitry 110 may generate a 5 GHz clock for DFE 120. In various embodiments, DFE 120 may use two paths of flip-flops to save and delay the data signal. For example, DFE 120 may activate the odd path of flip-flops to sample the incoming data signal on every rising edge of the clock signal and propagate the signal ire the odd path. On the other hand, DFE 120 may activate the even path of flip-flops to sample the incoming data signal on every falling edge of the clock signal and propagate the signal in the even path. However, the odd path and even path may not be activated simultaneously. Therefore, the delay from one flip-flop to the next in the same odd or even path is two UI in this half-rate architecture.

Figure 2:
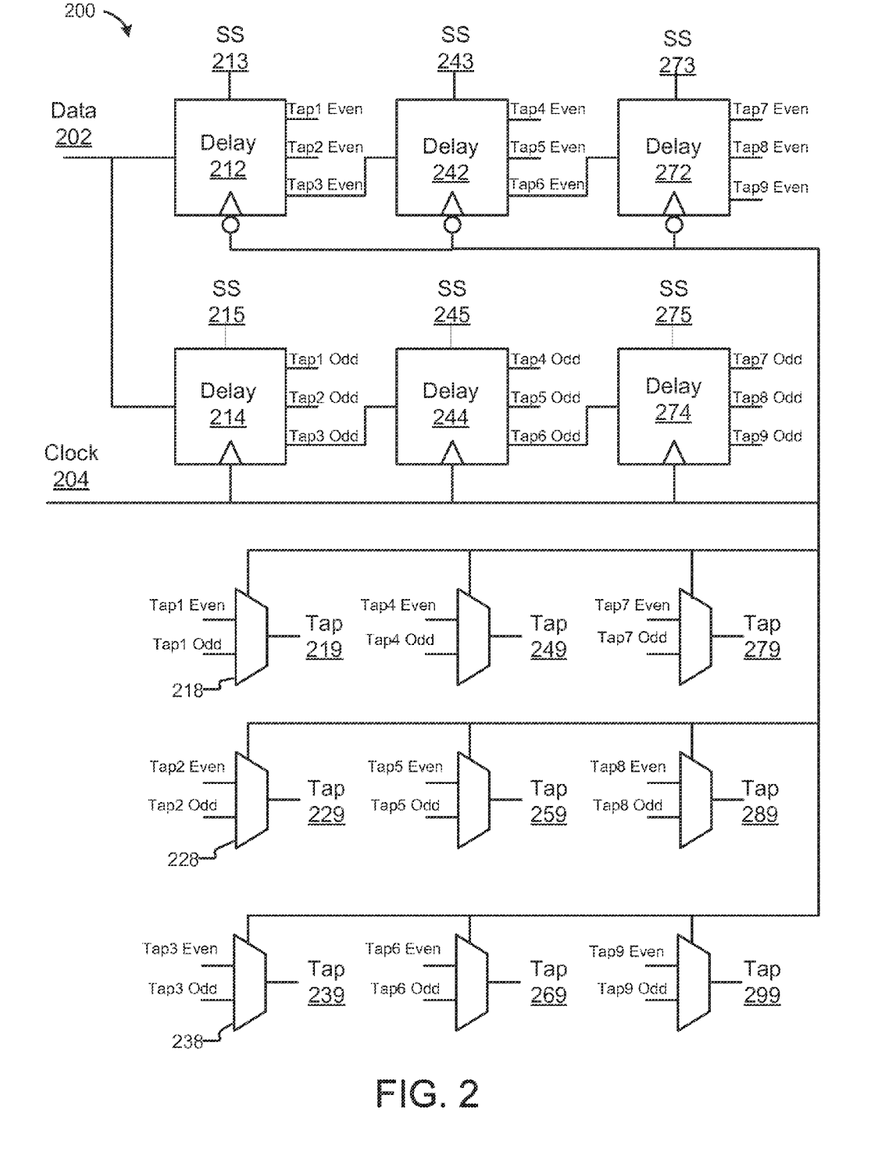
FIG. 2 is a schematic diagram of an example circuit for generating floating taps for decision feedback equalizers, incorporating aspects of the present disclosure, in accordance with various embodiments.

FIG. 2 is a schematic diagram of an example circuit 200 for generating floating taps for decision feedback equalizers, incorporating aspects of the present disclosure, in accordance with various embodiments. In some embodiments, circuit 200 may be a part of DFE 120 of FIG. 1. In various embodiments, circuit 200 may include a plurality of pairs of delay blocks and respective multiplexers to multiplex the output from respective pairs of delay blocks. One multiplexer may output one or more tap signals based on complementary signals provided by any one pair of delay blocks.

In various embodiments, each delay block may have a binary weighted delay path based on binary weighted sets of flip-flops in the delay path. Such delay path may be controlled by a binary number that corresponds to a specific delay path. Flip-flops in the delay path may be added or removed, based on the binary number, to increase or decrease the total delay of the delay path.

In one embodiment, circuit 200 may have three pairs of delay blocks, namely the first pair of delay 212 and delay 214, the second pair of delay 242 and delay 244, and the third pair of delay 272 and delay 274. Although only three pairs of delay blocks are shown in FIG. 2, in other embodiments, there may be more or fewer delay blocks as shown.

In one embodiment, the incoming data signal 202 may be first provided to the first pair of delay blocks, i.e., delay 212 and delay 214. Meanwhile, a clock 204 may be provided to all delay blocks. However, delay 214, delay 244, and delay 274 may receive the clock 204; while delay 212, delay 242, and delay 272 may receive an inverse version of the clock 204. Therefore, delay 214, delay 244, and delay 274 may be activated on the rising edges of the clock 204; and delay 212, delay 242, and delay 272 may be activated on the falling edges of the clock 204.

In various embodiments, a pair of delay blocks, e.g., delay 212 and delay 214, may output complementary signals that may be multiplexed into one or more taps, where each tap may be a delayed version of the data signal 202. Hereinafter, complementary signals may also be referred to as even and odd signals. For example, the output signals from the delay blocks may be referred to as even signals if they are generated based on the falling edges of the clock 204. Additionally, the output signals from the delay blocks may be referred to as odd signals if they are generated based on the rising edges of the clock 204.

As an example, delay 212 may output the even part of the three taps, namely tap 219, tap 229, and tap 239. On the other hand, delay 214 may output the odd part of the same three taps. In some embodiments, multiplexers 218, 228, and 238 may also receive the clock 204 and output the odd signal during a first half cycle of the clock signal and the even signal during a second half cycle of the clock signal. For example, when the clock 204 is high, these multiplexers may select the odd signal, e.g., outputted from delay 214; when the clock 204 is low, these multiplexers may select the even signal, e.g., outputted from delay 212. In this way, multiplexers 218, 228, and 238 may then multiplex the respective even and odd part of the tap signals to generate the complete tap signals, e.g., tap 219, tap 229, and tap 239.

Similarly, the output signals from the pair of delay 242 and delay 244 may be used to generate another three taps, e.g., tap 249, tap 259, and tap 269. Similarly, the output signals from the pair of delay 272 and delay 274 may be used to generate yet another three taps, e.g., tap 279, tap 289, and tap 299.

In various embodiments, the delay in one delay block may be controlled or programmed based on the selection signal coupled with the delay block. As an example, the selection signal SS 213 may be used to control the delay in delay 212, and the selection signal SS 215 may be used to control the delay in delay 214. Similarly, the selection signal SS 243 may be used to control the delay in delay 242, and the selection signal SS 245 may be used to control the delay in delay 244. Similarly, the selection signal SS 273 may be used to control the delay in delay 272, and the selection signal SS 275 may be used to control the delay in delay 274. In some embodiments, the selection signal may be the same to a pair of delay blocks. As an example, SS 213 may be the same as SS 215. Thus, the pair of delay blocks may generate complementary signals for the build-up of a complete tap. In some embodiments, the selection signals may be different, but they may carry the same binary control number. Thus, the pair of delay blocks may select similar delay paths in order to generate the same amount of delays for their complementary signals.

In some embodiments, the delay from one delay block may be based on the delay from its previous delay block. As an example, delay 242 receives the tap 3 even signal from delay 212, which is a delayed version of the data 202. After delay 242 adds more delays to its incoming signal, each output signal from delay 242 will have longer delay than any output signal from delay 212. By the same reason, each output signal from delay 272 will have longer delay than any output signals from delay 242. Therefore, the circuit 200 may output three sets of tap signals with different delays. As an example, tap 219, tap 229, and tap 239 may form the first set; tap 249, tap 259, and tap 269 may form the second set; and tap 279, tap 289, and tap 299 may form the third set. Each set of tap signals may be respectively controlled by their respective selection signals. Thus, different taps in one group may have different delays, while different sets of tap signals may also have different delays.

In various embodiments, the clock 204 may be a half-rate of the data rate of the data 202, thus enable the circuit 200 to operate in a half-rate architecture. As an example, if data 202 is received as a 10 Gbps signal, then the clock 204 may be operate at 5 GHz. In this half-rate architecture, delay 212 or delay 214 runs at half the speed of the data signal 202. Delay 214 may be active on the rising edge of the clock 204, while the delay 212 may be active on the falling edge of the clock 204. Thus, even though the incoming data 202 is coming in at twice the speed of the clock 204, delay 212 and delay 214 may each pick up half of the data 202. This allows a multiplexer, e.g., multiplexer 218, to multiplex the complementary output signals from delay 212 and delay 214 to form a complete tap, which is a delayed version of data 202. Therefore, circuit 200 may still offer the same performance of a circuit that would use a full-rate clock, but circuit 200 may save power for operating with the half-rate architecture.

Figure 3:
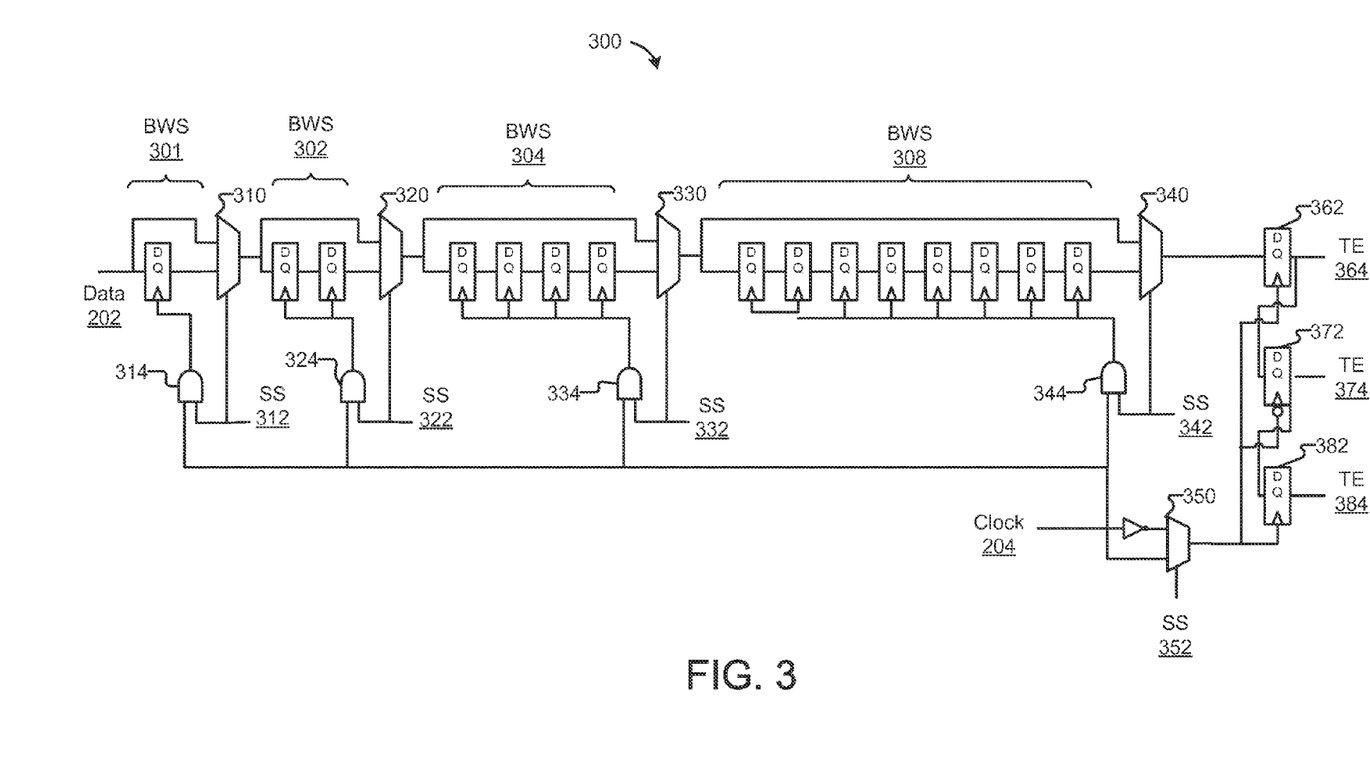
FIG. 3 is a schematic diagram of an example circuit for a delay block, incorporating aspects of the present disclosure, in accordance with various embodiments.

FIG. 3 is a schematic diagram of an example circuit 300 for a delay block, e.g., the delay 212 of FIG. 2. Those elements of FIG. 3 having the same reference numbers (or names) as the elements of any other figure can operate or function in any manner similar to that described, but are not limited to such. So as not to obscure the embodiments, elements and features discussed previously may not be repeated.

In this embodiment, circuit 300 may use a collection of flip-flops and multiplexers to create three programmable delays needed to save the data 202 for reflection cancellation. The flip-flops are used to store the information, while the multiplexers are used to select the path that the data 202 travels. The delay is programmable by changing the control signals for the multiplexers such that a different path may be selected. In various embodiments, circuit 300 may be used in DFEs to save power.

In various embodiments, circuit 300 may include multiplexers 310, 320, 330, and 340 coupled in series, with respective binary weighted sets (BWS) of flip-flops BWS 301, BWS 302, BWS 304, and BWS 308, coupled between successive pairs of the multiplexers. BWS 301, BWS 302, BWS 304, and BWS 308 may be binary weighted with respect to one another. As an example, BWS 301, the set of flip-flops before multiplexer 310, may only include one ($1=2^0$) flip-flop. As another example, BWS 302, the set of flip-flops between multiplexers 310 and 320, may include two ($2=2^1$) flip-flops. As another example, BWS 304, the set of flip-flops between multiplexers 320 and 330, may include four ($4=2^2$) flip-flops.

As another example, BWS 308, the set of flip-flops between multiplexers 330 and 340, may include eight ($8=2^3$) flip-flops. In some embodiments, circuit 300 may be further extended to have a binary number (e.g., $2^n$) of flip-flops interpolating two multiplexers, e.g., sixteen ($16=2^4$) flip-flops after multiplexer 340 if circuit 300 is further to be extended.

In various embodiments, a binary control number may be used to program the length of delay in circuit 300, and the delay may be changed based on whether the binary weighted sets of flip-flops are included or excluded from the delay path. In some embodiments, a binary number may set respective selection signals to multiplexers, so that respective flip-flops in BWS 301, 302, 304, or 308 may be selected. Subsequently, the delay may be increased or decreased by adding or removing $2^{N-1}$ flip-flops from the delay path based on whether the $N_{th}$ bit is set in the binary control number.

As an example, the binary control number "1001" may enable SS 312 and SS 342, but disable SS 322 and 332. Consequently, data 202 will go through BWS 301 and BWS 308, but bypass BWS 302 and BWS 304. Thus, the binary control number "1001" may use nine flip-flops in circuit 300, which is 1001 in binary.

Because of the simplification of the delay path based on binary weighted sets of flip-flops, the binary control number may determine which flip-flops are being used in the delay path. In various embodiments, if a set of flip-flops are not being used in the selected delay path, then this set of flip-flops may be turned off so that they are not contributing to the total power consumption. In various embodiments, a selection signal may be input to a control unit connected to a set of flip-flops to deactivate the set of flip-flops. As an example, logic gate 314, 324, 334, or 344 may implement logical conjunctions, and each may receive input from a respective selection signal as well as the clock 204. In the example of using "1001" as the binary control number, SS 322 and SS 332 are to be deactivated, e.g., to be set as zero. In this case, the logic gates 324 and 334 will turn off BWS 302 and BWS 304 respectively.

In this embodiment, the delayed data signal from multiplexer 340 is sent to the three flip-flops, 362, 372, and 382 to create three separate output signals TE 364, TE 374, and TE 384 that are delayed by one UI from one another (e.g., TE 374 is delayed by one UI from TE 364 and TE 384 is delayed by one UI from TE 374). TE 364, TE 374, or TE 384 may include either the odd part or the even part of a complete tap signal. Referring back to FIG. 2, the output signals TE 364, TE 374, and TE 384 may be multiplexed with their respective complementary signals to form complete tap signals. As an example, an individual multiplexer may receive the pair of complementary signals and generate an output signal that switches between the complementary signals based on the clock signal.

In some embodiments, clock 204 may be a half-rate clock comparing to the rate associated with data 202. In this a half-rate design, each flip-flop among the binary weighted sets of flip-flops may cause a two-UI delay. In order to make a delay of one-UI apart among TE 364, TE 374, or TE 384 in some embodiments, flip-flop 372 may use an inverse version of the clock signal coming to flip-flop 362 and flip-flop 382. Further, the multiplexer 350 may receive another selection signal of SS 352 and output the clock signal 204 or an inversed version of the clock 204 depending on the additional delay needed at TE 364, TE 374, or TE 384. As an example, for getting a 10-UI delay at TE 364, BWS 301, BWS 302 and BWS 308 may be bypassed, but BWS 304 may be used, which gives a total delay of 8 UI as the output from multiplexer 340 to flip-flop 362. Because this is a half-rate design, flip-flop 362 may add the remaining two UI to the delay path if the clock for flip-flop 362 is the same as the clock used for BWS 304. Resultantly, circuit 300 may generate a 10-UI delay at TE 364, 11-UI delay at TE 374, and 12-UI delay at TE 384. As another example, for getting a 9-UI delay at TE 364, BWS 304 may be used and the rest of binary weighted sets of flip-flops may be bypassed, similar to the previous example. Because this is a half-rate design, flip-flop 362 may add the remaining one UI to the delay path if the clock for flip-flop 362 is inversed from the clock used for BWS 304, which may be obtained if multiplexer 350 is adjusted to output the inversed version of clock 204.

In circuit 300, the delay path may be determined by a binary control number and does not require a complicated encoder. Without any encoders, the number of blocks in the circuit may be reduced. Moreover, certain sets of flip-flops may be disabled if they are not used for the delay, thus introducing more power-savings. Further, power may be reduced because circuit 300 may be used in a half-rate architecture.

In various embodiments, in order to calibrate circuit 300, a training sequence may be used. This sequence may be used to determine the delay for each set of taps. As an example, all of the possible tap positions may be cycled through and a respective amount of interference removed based on each tap position may be determined. In this way, the training sequence may be used to calibrate circuit 300 to a suitable tap position to remove the most amount of interference. In some embodiments, the floating tap based on circuit 300 may be used together with fixed taps that the standard DFE may have to remove even more amount of interference.

Figure 4:
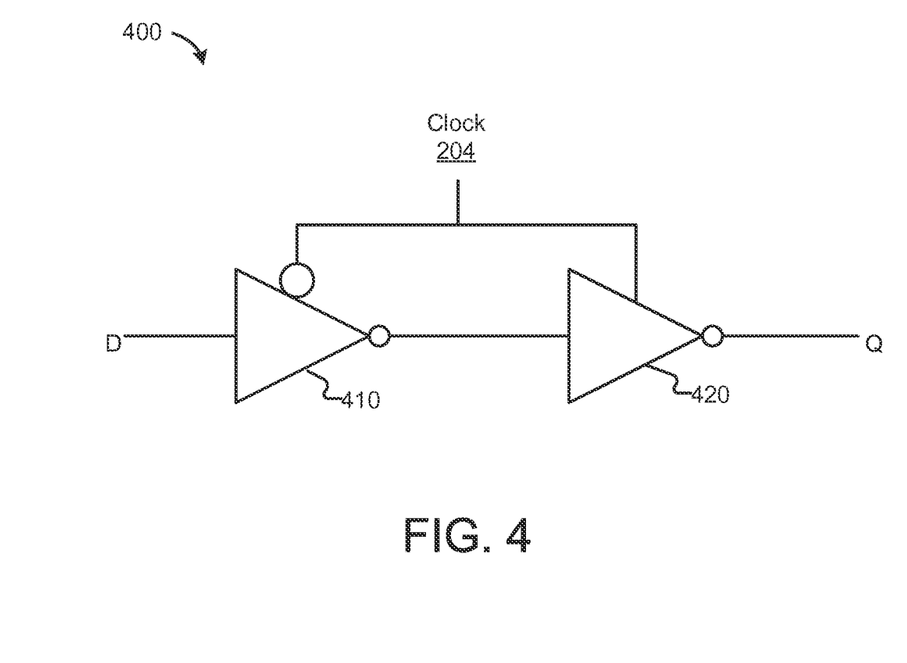
FIG. 4 is a schematic diagram of an example circuit for a flip-flop, incorporating aspects of the present disclosure, in accordance with various embodiments.

FIG. 4 is a schematic diagram of an example circuit for a flip-flop, e.g., any one among the binary weighted sets of flip-flops depicted in FIG. 3. Those elements of FIG. 4 having the same reference numbers (or names) as the elements of any other figure can operate or function in any manner similar to that described, but are not limited to such. So as not to obscure the embodiments, elements and features discussed previously may not be repeated.

In various embodiments, flip-flop 400 may include a first inverter 420 to receive the clock 204 and a second inverter 410 to receive an inverted version of the clock 204. In various embodiments, inverter 410 and inverter 420 may be controlled by their respective clock signals. As an example, the inverter 420 may perform normal functions when the clock 204 is high for inverter 420. However, inverter 420 may not pass through any information when the clock 204 is low for inverter 420.

In various embodiments, flip-flop 400 may not include additional "keepers," which are a group of additional inverters (e.g., cross-coupled inverters) commonly used in traditional flip-flops to save the data. Thus, flip-flop 400 may further reduce the number of devices in the circuit, thus saving more power and area. Without any additional keepers, data in flip-flop 400 is still unlikely to be disturbed by other devices because the amount of load for flip-flop 400 is usually minimal.

In various embodiments, the power saving features associated with the circuit design in flip-flop 400, in combination with the power saving features in connection with the binary weighted sets of flip-flops in the delay blocks operated in a half-rate architecture, may allow for a low power solution for creating a programmable delay for several sets of floating taps, e.g., as with circuit 200. In one embodiment, the worst-case power consumption of circuit 200 may range from between 1.65 mW to 2.61 mW depending on the length of the delay, which may be translated to at least 80% or more power savings compared to traditional designs. Therefore, the design principles as disclosed herein may be appealing for use in chips that have strict power requirements.

Figure 5:
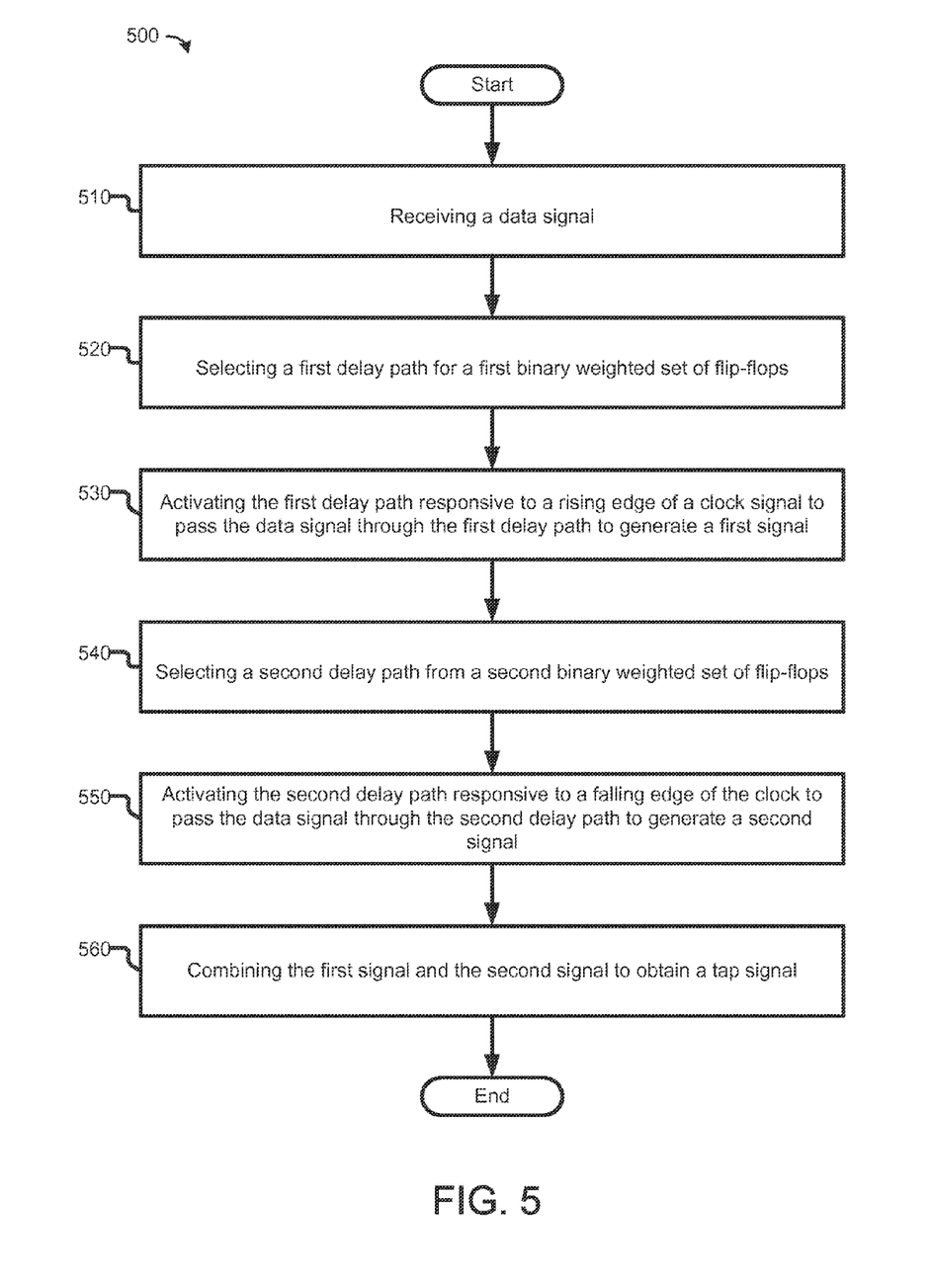
FIG. 5 is a flow diagram of an example process executable by an example apparatus for generating a floating tap, in accordance with various embodiments.

FIG. 5 is a flow diagram of an example process executable by an example apparatus for generating a floating tap. As shown, process 500 may be performed by a circuit (e.g., circuit 200) utilizing the design principal as disclosed herein to implement one or more embodiments of the present disclosure.

In embodiments, at 510, the process 500 may include receiving a data signal, e.g., by delay 212 and delay 214 of FIG. 2. At 520, the process 500 may include selecting a first delay path based on a first group of binary-weighted sets of flip-flops. As an example, delay 212 may include a binary weighted sets of flip-flops, e.g., such as those illustrated in FIG. 3. In various embodiments, the first delay path may be controlled by a binary number in the selection signal of SS 213.

In various embodiments, at 530, the process 500 may include activating the first delay path responsive to a rising edge of a clock signal to pass the data signal through the first delay path to generate a first signal. As an example, the clock signal may be generated by clock circuitry 110 of FIG. 1, and the clock signal may be at a half-rate of the rate of the data signal. During the rising edge of the clock signal, the first delay path may be activated to add delays to the data signal. In various embodiments, some flip-flops in the binary weighted sets of flip-flops may be deactivated if they are excluded from the first delay path to further save power for the circuit.

In embodiments, at 540, the process 500 may include selecting a second delay path from a second group of binary weighted sets of flip-flops. As an example, delay 214 may include a binary weighted sets of flip-flops, e.g., such as those illustrated in FIG. 3. In various embodiments, the second delay path may be controlled by a binary number, e.g., in the selection signal of SS 215. In various embodiments, the controlling binary number for selecting the second delay path may be the same as the controlling binary number for selecting the first delay path. Thus, the second delay path may provide the odd part of a tap signal while the first delay path may provide the even part of the tap signal.

In embodiments, at 550, the process 500 may include activating the second delay path responsive to a falling edge of the clock to pass the data signal through the second delay path to generate a second signal. As previously discuss in connection with block 530, the clock signal may be at a half-rate of the rate of the data signal. During the falling edge of the clock signal, the second delay path may be activated to add delays to the data signal. Similarly, some flip-flops in the binary weighted sets of flip-flops may be deactivated if they are excluded from the second delay path to further save power for the circuit. It may be noted that since the rising edges and the falling edges alternate in the clock signal, the first and second delay paths may not be activated simultaneously.

In embodiments, at 560, the process 500 may include combining the first signal and the second signal to obtain a tap signal. In various embodiments, the first signal and the second signal may be complementary to each other as they represent even and odd parts of a delayed data signal. These two signals may be combined, e.g., through multiplexer 218 of FIG. 2, into a tap signal, e.g., tap 219 of FIG. 2. Such tap signal may be used to remove interference (e.g., ISI) of the data signal.

In various embodiments, it may be desirable to remove as much interference as possible. However, reflections may occur at various locations, e.g., depending on the channel or board used. Thus, the process 500 may further include preparing various tap signals with different tap positions and different delay paths (e.g., via blocks 520, 530, 540, 550, and 560). Subsequently, respective amounts of interference removed from the data signal may be obtained based on these tap positions. Thus, a DFE may be calibrated to use a suitable tap position based on the respective amounts of interference removed from the data signal. Even further, a DFE with floating taps may work in synergy with the fixed taps that a standard DFE may have to remove the most amount of interference in some embodiments.

Figure 6:
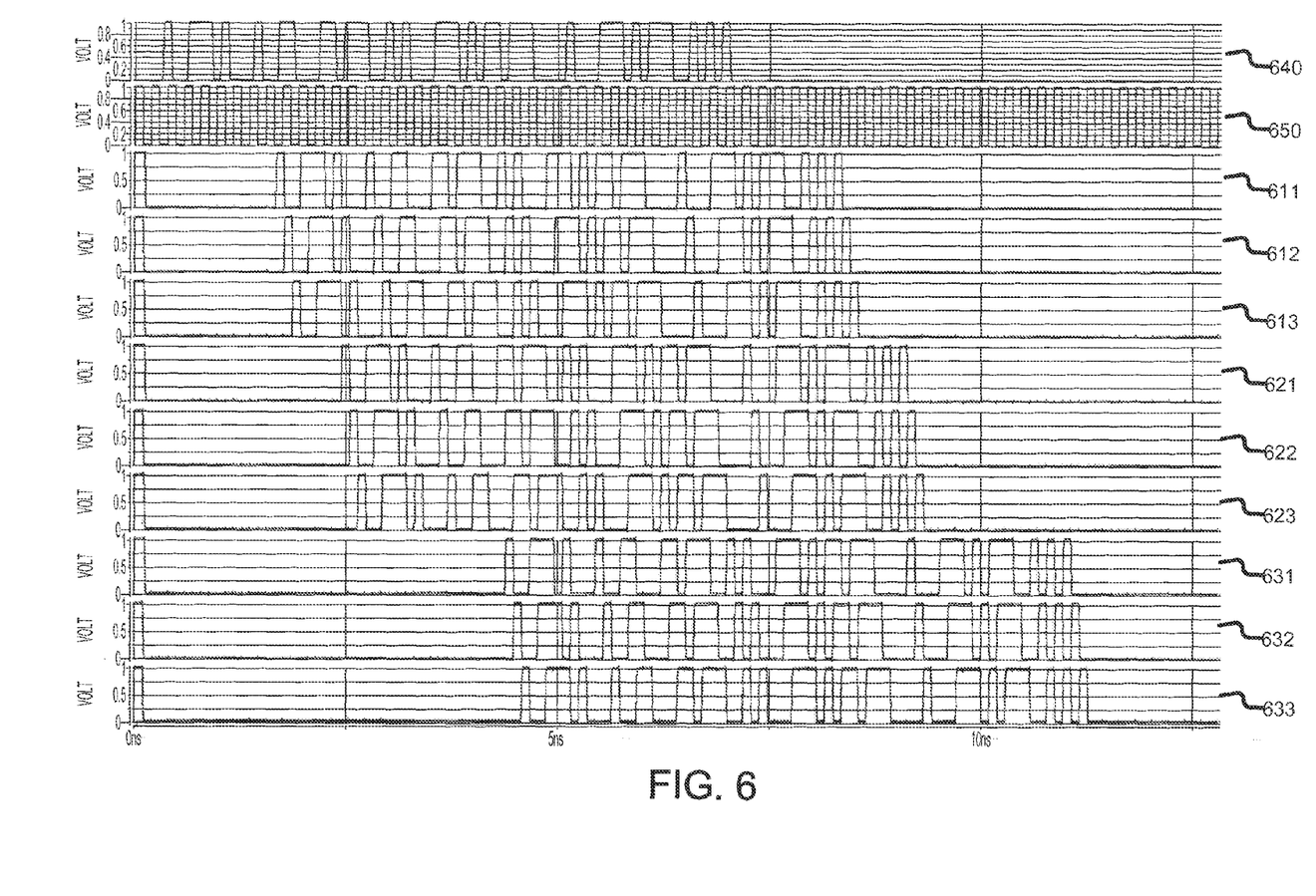
FIG. 6 is a set of plots showing various tap signals, incorporating aspects of the present disclosure, in accordance with various embodiments.

FIG. 6 is a set of plots showing various tap signals, e.g., generated by DFE 120 of FIG. 1 or circuit 200 of FIG. 2. Plot 640 shows the data signal coming to the DFE. Plot 650 shows the clock signal generated for the DFE. In this embodiment, the clock signal may be at a half-rate of the clock associated with the data signal. Plots 611, 612, and 613 shows three tap signals from one delay block with one UI apart, e.g., corresponding to tap 219, tap 229, and tap 239 of FIG. 2. Plots 621, 622, and 623 shows three tap signals from another delay block with one UI apart, e.g., corresponding to tap 249, tap 259, and tap 269 of FIG. 2. Similarly, Plots 631, 632, and 633 shows three tap signals from yet another delay block with one UI apart, e.g., corresponding to tap 279, tap 289, and tap 299 of FIG. 2.

In various embodiments, each set of taps may be independently controlled. As shown, the tap signal in plot 611 has a programmable delay from the data signal in plot 640, while the tap signal in plot 621 has another programmable delay from the data signal in plot 640. However, the tap signal in plot 631 has another prolonged delay from the data signal in plot 640. Also, it may be noted that the delay between respective tap signals in plot 611 and plot 621 is substantially different from the delay between respective tap signals in plot 621 and plot 631 because each delay block (e.g., the pair of delay 212 and 214, the pair of delay 242 and 244, and the pair of delay 272 and 274 of FIG. 2) may be independently controlled, e.g., based on the controlling binary number conveyed in their respective selection signals (e.g., SS 213, SS 243, and SS 273 of FIG. 2). Therefore, DFEs as disclosed herein may effectively control the limited number of delay blocks to strategically select floating tap position based on where the reflections occur.

Figure 7:
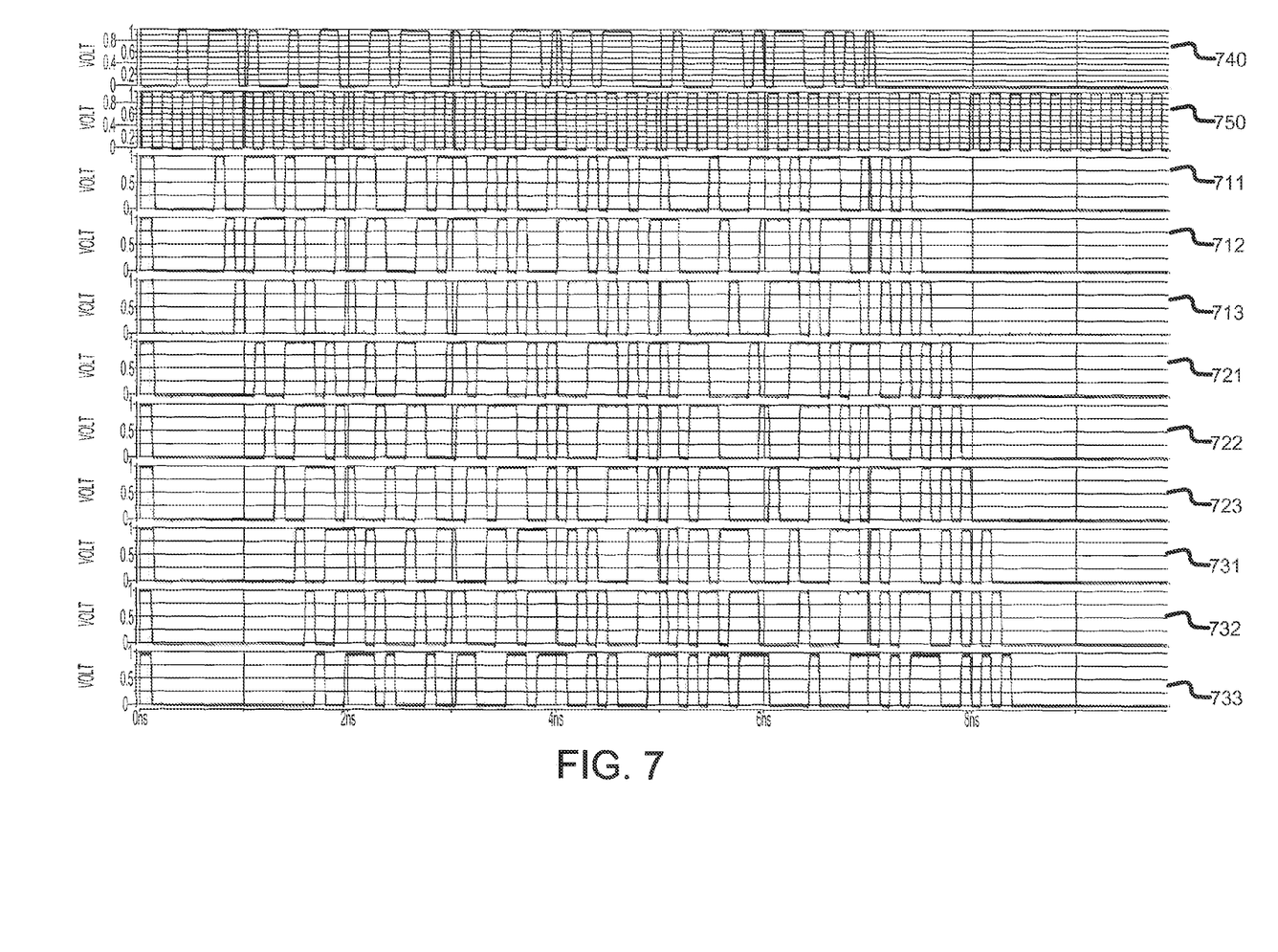
FIG. 7 is another set of plots showing various tap signals, incorporating aspects of the present disclosure, in accordance with various embodiments.

FIG. 7 is another set of plots showing various tap signals, e.g., generated by DFE 120 of FIG. 1 or circuit 200 of FIG. 2. Similar to FIG. 6, plot 740 shows the data signal coming to the DFE, and plot 750 shows the clock signal generated for the DFE, which may be at a half-rate of the clock associated with the data signal. Plots 711, 712, and 713 show three tap signals from one delay block with one UI apart, e.g., corresponding to tap 219, tap 229, and tap 239 of FIG. 2. Plots 721, 722, and 723 show three tap signals from another delay block with one UI apart, e.g., corresponding to tap 249, tap 259, and tap 269 of FIG. 2. Similarly, Plots 731, 732, and 733 show three tap signals from yet another delay block with one UI apart, e.g., corresponding to tap 279, tap 289, and tap 299 of FIG. 2.

In FIG. 7, a common delay schema is selected for all three sets of taps. As shown, output tap signals are slightly delayed versions of the input data signal in plot 740, and all tap signals are follow each other closely. With this configuration, a DFE as disclosed herein may cover a range of tap positions to calibrate the DFE to target where the reflections occur.

Figure 8:
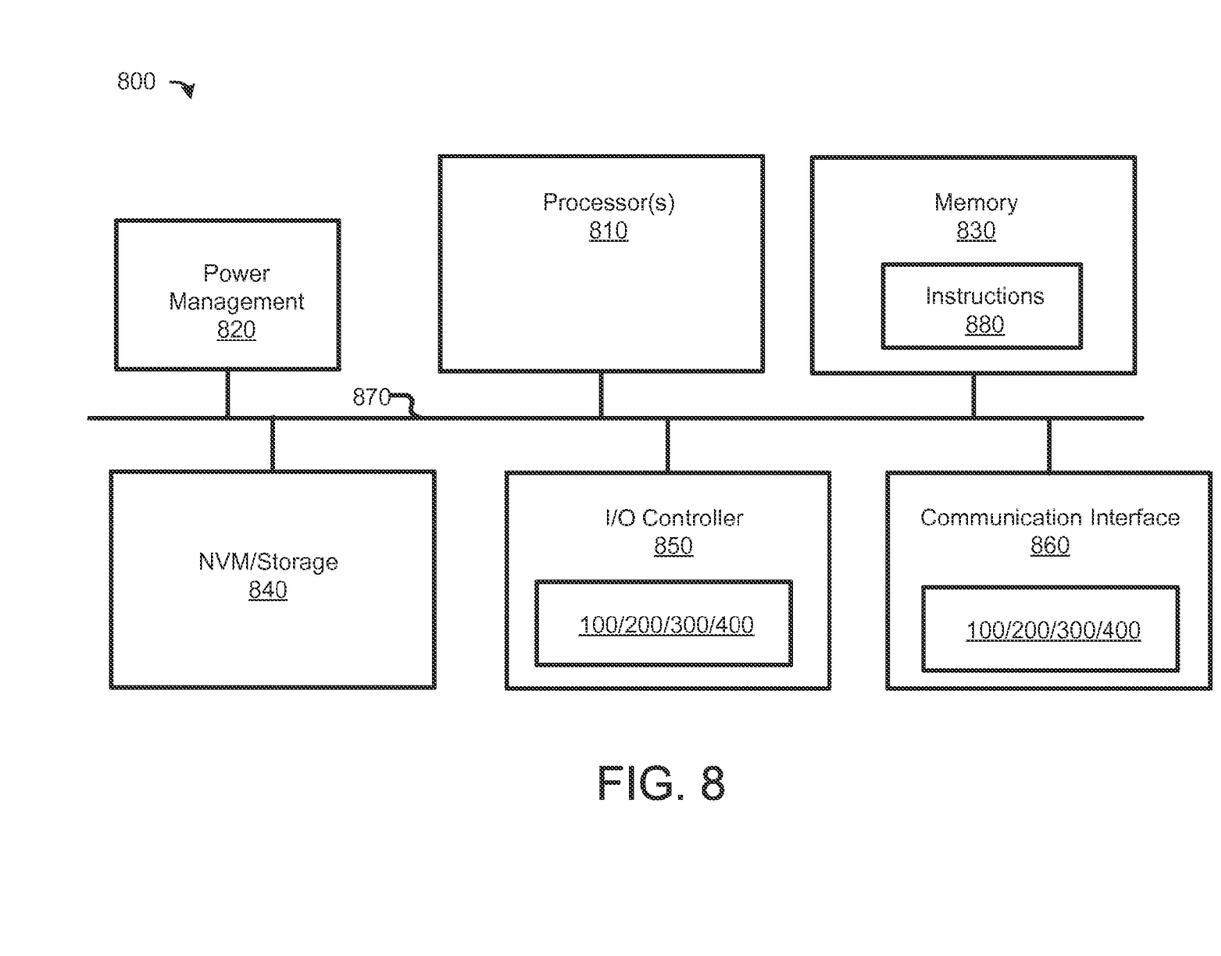
FIG. 8 is a block diagram that illustrates an example computer device suitable for practicing the disclosed embodiments, in accordance with various embodiments.

FIG. 8 is a block diagram that illustrates an example computer system 800 suitable for practicing the disclosed embodiments with any of the design principles described with reference to FIGS. 1-5, in accordance with various embodiments. In one embodiment, compute system 800 represents a mobile computing device, such as a computing tablet, a mobile phone or smartphone, a wireless-enabled e-reader, or another wireless mobile device. It will be understood that certain components are shown generally, and not all components of such a device are shown in computing system 800.

As shown, computer system 800 may include a power management 820; a number of processors or processor cores 810, a system memory 830 having processor-readable and processor-executable instructions 880 stored therein, a non-volatile memory (NVM)/storage 840, an I/O controller 850, and a communication controller 860. For the purpose of this application, including the claims, the terms "processor" and "processor cores" may be considered synonymous, unless the context clearly requires otherwise. Those elements of FIG. 8 having the same reference numbers (or names) as the elements of any other figure can operate or function in any manner similar to that described, but are not limited to such.

In one embodiment, processors 810 may include one or more physical devices, such as microprocessors, application processors, microcontrollers, programmable logic devices, or other processing means. The processing operations performed by processors 810 may include the execution of an operating platform or operating system on which applications and/or device functions are executed. The processing operations may include operations related to input/output (I/O) with a human user or with other devices, operations related to power management, and/or operations related to connecting the computing system 800 to another device. The processing operations may also include operations related to audio I/O and/or display I/O.

The one or more NVM/storage 840 and/or the system memory 830 may comprise a tangible, non-transitory computer-readable storage device (such as a diskette, hard drive, compact disc read only memory (CD-ROM), hardware storage unit, flash memory, phase change memory (PCM), solid-state drive (SSD) memory, and so forth). Instructions 880 stored in system memory 830 and/or NVM/storage 840 may be executable by one or more of the processors 810. Instructions 880 may contain particular instructions of an operating system and one or more applications.

Computer system 800 may also include input/output devices (not shown) coupled to computer system 800 via I/O controller 850. I/O controller 850 illustrates a connection point for additional devices that connect to computing system 800 through which a user might interact with the system. For example, various devices that may be coupled to the computer system 800 via I/O controller 850 may include microphone devices, speaker or stereo systems, video systems or other display devices, keyboard or keypad devices, or other I/O devices for use with specific applications such as card readers or other devices.

In various embodiments, I/O controller 850 may include apparatus 100 of FIG. 1, circuit 200 of FIG. 2, circuit 300 of FIG. 3, and/or flip-flop 400 of FIG. 4. In various embodiments, I/O controller 850 may include a DFE (e.g., like DFE 120 of FIG. 1) to generate floating taps to equalize an I/O channel and reduce ISI in a wide range of symbols.

In embodiments, communication controller 860 may provide an interface for computing system 800 to communicate over one or more network(s) and/or with any other suitable device. Communication controller 860 may include any suitable hardware and/or firmware, such as a network adapter, one or more antennas, wireless interface(s), and so forth. In various embodiments, communication controller 860 may include an interface for computing system 800 to use near field communication (NFC), optical communications, or other similar technologies to communicate directly (e.g., without an intermediary) with another device. In various embodiments, communication controller 860 may interoperate with radio communications technologies such as, for example, Wideband Code Division Multiple Access (WCDMA), Global System for Mobile Communications (GSM), Long Term Evolution (LTE), WiFi, Bluetooth®, Zigbee, and the like.

In various embodiments, communication controller 860 may include apparatus 100 of FIG. 1, circuit 200 of FIG. 2, circuit 300 of FIG. 3, and/or flip-flop 400 of FIG. 4. In various embodiments, communication controller 860 may include a DFE (e.g., like DFE 120 of FIG. 1) to generate floating taps to equalize even a high-loss communication channel and reduce ISI in a wide range of symbols.

The various elements of FIG. 8 may be coupled to each other via a system bus 870, which represents one or more buses. In the case of multiple buses, they may be bridged by one or more bus bridges (not shown). Data may pass through the system bus 870 through the I/O controller 850, for example, between an output terminal and the processors 810.

System memory 830 and NVM/storage 840 may be employed to store a working copy and a permanent copy of the programming instructions implementing one or more operating systems, firmware modules or drivers, applications, and so forth, herein collectively denoted as instructions 880. In embodiments, instructions 880 may include logic for generating floating taps for decision feedback equalizers described in this disclosure. The permanent copy of the programming instructions may be placed into permanent storage in the factory, or in the field, via, for example, a distribution medium (not shown), such as a compact disc (CD), or through the communication controller 860 (from a distribution server (not shown)).

In some embodiments, at least one of the processor(s) 810 may be packaged together with I/O controller 850 to form a System in Package (SiP). In some embodiments, at least one of the processor(s) 810 may be integrated on the same die with I/O controller 850. In some embodiments, at least one of the processor(s) 810 may be integrated on the same die with I/O controller 850 to form a System on Chip (SiC).

According to various embodiments, one or more of the depicted components of the system 800 and/or other element(s) may include a keyboard, LCD screen, non-volatile memory port, multiple antennas, graphics processor, application processor, speakers, or other associated mobile device elements, including a camera. The remaining constitution of the various elements of the computer system 800 is known, and accordingly will not be further described in detail.

The above description of illustrated embodiments, including what is described in the Abstract, is not intended to be exhaustive or to be limited to the precise forms disclosed. While specific embodiments and examples are described herein for illustrative purposes, various modifications are possible. For example, the configuration and connection of certain elements in various embodiments that have been described above may be modified without departing from the teachings in connection with FIGS. 1-5. These and other modifications can be made in light of the above detailed description. The terms used in the following claims should not be construed to be limited to the specific embodiments disclosed in the specification.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specifica-tion states a component, feature, structure, or characteristic "may," "might," or "could" be included, that particular component, feature, structure, or characteristic is not required to be included. If the specification or claim refers to "a" or "an" element, that does not mean there is always only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications, and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to the implementation of such block diagram arrangements are highly dependent upon the platform within which the present disclosure is to be implemented (i.e., such specifics should be well within the purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

The following examples pertain to further embodiments. Specifics in the examples may be used anywhere in one or more embodiments. All optional features of the apparatus described herein may also be implemented with respect to a method or process.

Example 1 is a decision feedback equalizer (DFE). The DFE may include a first delay cell including a first group of binary weighted sets of flip-flops, the first delay cell to receive a data signal and output a first signal based on a first sample of the data signal on a falling edge of a clock signal and a first delay path selected from the first group of binary weighted sets of flip-flops; a second delay cell coupled to the first delay cell and including a second group of binary weighted sets of flip-flops, the second delay cell to receive the data signal and to output a second signal based on a second sample of the data signal on a rising edge of the clock signal and a second delay path selected from the second group of binary weighted sets of flip-flops; and a multiplexer coupled to the first delay cell and the second delay cell to receive the first signal and the second signal, the multiplexer to output a tap signal based on the first signal and the second signal.

Example 2 may include the subject matter of Example 1, and may further include a clock circuitry to generate the clock signal to be a half-rate of a data rate of the data signal.

Example 3 may include the subject matter of Example 1 or 2, and may further include control circuitry to power off one or more flip-flops of the first group of binary weighted sets of flip-flops when the one or more flip-flops are excluded from the first and second delay paths.

Example 4 may include the subject matter of Example 3, and may further specify that the control circuitry comprises a logic gate to receive the clock signal and a selection signal, and a selection multiplexer coupled to the logic gate to receive the selection signal; and wherein the control circuitry is to power off one of the one or more flip-flops when the selection signal has a first logic value.

Example 5 may include any subject matter of Examples 1-4, and may further specify that wherein the first delay cell is to select the first delay path based on a binary number, and wherein the second delay cell is to select the second delay path based on the same binary number.

Example 6 may include any subject matter of Examples 1-5, and may further specify that the multiplexer is to output the tap signal as a delayed version of the data signal, and the multiplexer is to output the first signal during a first half cycle of the clock signal and to output the second signal during a second half-cycle of the clock signal.

Example 7 may include any subject matter of Examples 1-6, and may further specify that at least one flip-flop of the first or second groups of binary weighted sets of flip-flops includes only two inverters, including a first inverter to receive the clock signal and a second inverter to receive an inverted version of the clock signal.

Example 8 may include any subject matter of Examples 1-7, and may further specify that the first group of binary weighted sets of flip-flops comprises a plurality of selecting multiplexers coupled in series, and wherein respective sets of flip-flops of the first group of binary weighted sets of flip flops are coupled between successive pairs of the selecting multiplexers.

Example 9 is a receiver circuitry. The receiver circuitry may include a decision feedback equalizer (DFE) to output floating tap signals for equalizing a data signal, the DFE having: a first pair of delay cells to output a first set of tap signals based on the data signal, wherein the first set of tap signals are delayed from one another by one unit interval (UI) of a clock signal, and an initial tap signal of the first set of tap signals has a first programmable delay from the data signal; and a second pair of delay cells, coupled to the first pair of delay cells, to output a second set of tap signals based at least in part on the first set of tap signals, wherein the second set of tap signals are delayed from one another by one UI, and an initial tap signal of the second set of tap signals has a second programmable delay from the data signal; wherein the first and second programmable delays are based at least in part on respective delay paths selected from respective binary-weighted sets of flip-flops in the first and second pairs of delay cells.

Example 10 may include the subject matter of Example 9, and may further include a clock circuitry to generate the clock signal to be a half-rate of a data rate of the data signal.

Example 11 may include the subject matter of Example 9 or 10, and may further include a training circuitry, coupled to the DFE, to calibrate the first or second programmable delay based on respective amounts of interference removed from the data signal by the first and second sets of tap signals.

Example 12 may include any subject matter of Examples 9-11, and may further specify that the first and second pairs of delay cells are to select the respective delay paths based on respective binary numbers.

Example 13 may include any subject matter of Examples 9-12, and may further specify that wherein the first pair of delay cells comprise: an even delay cell to output an even part of the initial tap signal of the first set of tap signals based on a first sample of the data signal on a falling edge of the clock signal; and an odd delay cell to output an odd part of the initial tap signal of the first set of tap signals based on a second sample of the data signal on a rising edge of the clock signal; wherein the clock signal is at a half-rate of a rate of the data signal.

Example 14 may include the subject matter of Example 13, and may further specify that wherein the even delay cell is to select a first delay path based on a binary number; and wherein the odd delay cell is to select a second delay path based on the same binary number.

Example 15 may include the subject matter of Example 13 or 14, and may further specify that wherein the first pair of delay cells further comprise a multiplexer, coupled to the even delay cell and the odd delay cell, to output the first set of tap signals.

Example 16 may include the subject matter of Example 15, and may further specify that wherein the multiplexer is to output signals from the even delay cell during a first half cycle of the clock signal and to output signals from the odd delay cell during a second half-cycle of the clock signal.

Example 17 is a method for decision feedback equalization, which may include receiving a data signal; selecting a first delay path for a first group of binary weighted sets of flip-flops; activating the first delay path responsive to a rising edge of a clock signal to pass the data signal through the first delay path to generate a first signal; selecting a second delay path from a second group of binary weighted sets of flip-flops; activating the second delay path responsive to a falling edge of the clock to pass the data signal through the second delay path to generate a second signal; and combining the first signal and the second signal to obtain a tap signal.

Example 18 may include the subject matter of Example 17, and may further include deactivating one or more flip-flops in the first or second groups of binary weighted sets of flip-flops when the one or more flip-flops are excluded from the first and second delay paths.

Example 19 may include the subject matter of Example 17 or 18, and may further include preparing a plurality of tap positions with different delay paths; obtaining respective amounts of interference removed from the data signal based on the plurality of tap positions; and determine a calibrated tap position based on the respective amounts of interference removed from the data signal.

Example 20 may include any subject matter of Examples 17-19, and may further include removing interference of the data signal based on the tap signal.

Example 21 is at least one storage medium having instructions configured to cause an apparatus, in response to execution of the instructions by the apparatus, to practice any subject matter of Examples 17-20.

Example 22 is an apparatus, which may include means to practice any subject matter of Examples 17-20.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A decision feedback equalizer (DFE), comprising:
a first delay cell including a first group of binary weighted sets of flip-flops to be selectably included or excluded to form various delay paths of various lengths of delay based on various binary control numbers, the first delay cell to receive a data signal and output a first signal based on a first sample of the data signal on a falling edge of a clock signal and a first delay path formed with first selected one or more members of the first group of binary weighted sets of flip-flops based on a first binary control number;
a second delay cell coupled to the first delay cell and including a second group of binary weighted sets of flip-flops to be selectably included or excluded to form various delay paths of various lengths of delay based on various binary control numbers, the second delay cell to receive the data signal and to output a second signal based on a second sample of the data signal on a rising edge of the clock signal and a second delay path formed with second selected one or more members of the second group of binary weighted sets of flip-flops based on a second binary control number; and
a multiplexer coupled to the first delay cell and the second delay cell to receive the first signal and the second signal, the multiplexer to output a tap signal based on the first signal and the second signal.

2. The DFE of claim 1, further comprising a clock circuitry to generate the clock signal to be a half-rate of a data rate of the data signal.

3. The DFE of claim 1, further comprising control circuitry to power off one or more flip-flops of the first group of binary weighted sets of flip-flops when the one or more flip-flops are excluded from the first and second delay paths.

4. The DFE of claim 3, wherein the control circuitry comprises a logic gate to receive the clock signal and a selection signal, and a selection multiplexer coupled to the logic gate to receive the selection signal; and wherein the control circuitry is to power off one of the one or more flip-flops when the selection signal has a first logic value.

5. The DFE of claim 1, wherein the first delay cell is to select the first delay path based on a binary number, and wherein the second delay cell is to select the second delay path based on the same binary number.

6. The DFE of claim 1, wherein the multiplexer is to output the tap signal as a delayed version of the data signal, and wherein the multiplexer is to output the first signal during a first half cycle of the clock signal and to output the second signal during a second half-cycle of the clock signal.

7. The DFE of claim 1, wherein at least one flip-flop of the first or second groups of binary weighted sets of flip-flops includes only two inverters, including a first inverter to receive the clock signal and a second inverter to receive an inverted version of the clock signal.

8. The DFE of claim 1, wherein the first group of binary weighted sets of flip-flops comprises a plurality of selecting multiplexers coupled in series, and wherein respective sets of flip-flops of the first group of binary weighted sets of flip flops are coupled between successive pairs of the selecting multiplexers.

9. A receiver circuitry, comprising:
a decision feedback equalizer (DFE) to output floating tap signals for equalizing a data signal, the DFE having:
a first pair of delay cells to output a first set of tap signals based on the data signal, wherein the first set of tap signals are delayed from one another by one unit interval (UI) of a clock signal, and an initial tap signal of the first set of tap signals has a first programmable delay from the data signal; and
a second pair of delay cells, coupled to the first pair of delay cells, to output a second set of tap signals based at least in part on the first set of tap signals, wherein the second set of tap signals are delayed from one another by one UI, and an initial tap signal of the second set of tap signals has a second programmable delay from the data signal;
wherein the first and second programmable delays are based at least in part on respective delay paths formed with respective first and second selected members of first and second binary-weighted sets of flip-flops in the first and second pairs of delay cells based on corresponding first and second binary control numbers; wherein the first and second binary-weighted sets of flip-flops are selectably included or excluded to form various delay paths of various lengths of delay based on various binary control numbers.

10. The receiver circuitry of claim 9, further comprising:
a clock circuitry to generate the clock signal to be a half-rate of a data rate of the data signal.

11. The receiver circuitry of claim 9, further comprising:
a training circuitry, coupled to the DFE, to calibrate the first or second programmable delay based on respective amounts of interference removed from the data signal by the first and second sets of tap signals.

12. The receiver circuitry of claim 9, wherein the first and second pairs of delay cells are to select the respective delay paths based on respective binary numbers.

13. The receiver circuitry of claim 9, wherein the first pair of delay cells comprise:
an even delay cell to output an even part of the initial tap signal of the first set of tap signals based on a first sample of the data signal on a falling edge of the clock signal; and
an odd delay cell to output an odd part of the initial tap signal of the first set of tap signals based on a second sample of the data signal on a rising edge of the clock signal;
wherein the clock signal is at a half-rate of a rate of the data signal.

14. The receiver circuitry of claim 13, wherein the even delay cell is to select a first delay path based on a binary number; and wherein the odd delay cell is to select a second delay path based on the same binary number.

15. The receiver circuitry of claim 13, wherein the first pair of delay cells further comprise a multiplexer, coupled to the even delay cell and the odd delay cell, to output the first set of tap signals.

16. The receiver circuitry of claim 15, wherein the multiplexer is to output signals from the even delay cell during a first half cycle of the clock signal and to output signals from the odd delay cell during a second half-cycle of the clock signal.

17. A method for decision feedback equalization, comprising:
receiving a data signal;
selecting a first delay path for a first group of binary weighted sets of flip-flops;

activating the first delay path responsive to a rising edge of a clock signal to pass the data signal through the first delay path to generate a first signal;

selecting a second delay path from a second group of binary weighted sets of flip-flops;

activating the second delay path responsive to a falling edge of the clock to pass the data signal through the second delay path to generate a second signal; and combining the first signal and the second signal to obtain a tap signal.

18. The method of claim 17, further comprising:

deactivating one or more flip-flops in the first or second groups of binary weighted sets of flip-flops when the one or more flip-flops are excluded from the first and second delay paths.

19. The method of claim 17, further comprising:

preparing a plurality of tap positions with different delay paths;

obtaining respective amounts of interference removed from the data signal based on the plurality of tap positions; and determine a calibrated tap position based on the respective amounts of interference removed from the data signal.

20. The method of claim 17, further comprising:

removing interference of the data signal based on the tap signal.

* * * * *